United States Patent [19]

Wolk

[11] 4,021,328

[45] May 3, 1977

[54] SOLIDFYING SOLVENT REFINED COAL

[75] Inventor: Ronald H. Wolk, San Jose, Calif.

[73] Assignee: Electric Power Research Institute, Inc., Palo Alto, Calif.

[22] Filed: Mar. 19, 1976

[21] Appl. No.: 668,772

[52] U.S. Cl. .................................. 208/8; 208/39; 44/1 R

[51] Int. Cl.$^2$ ........................................ C10G 1/00

[58] Field of Search ............ 208/8, 39, 41; 44/1–11

[56] References Cited

UNITED STATES PATENTS

| | | | |
|---|---|---|---|
| 1,576,253 | 3/1926 | Summers | 44/1 R |
| 3,317,289 | 5/1967 | Braun | 44/10 R |
| 3,434,967 | 3/1969 | Oldenburg | 208/39 |
| 3,748,254 | 7/1973 | Gorin | 208/8 |
| 3,920,418 | 11/1975 | Rice | 208/8 |

*Primary Examiner*—Veronica O'Keefe
*Attorney, Agent, or Firm*—Townsend and Townsend

[57] ABSTRACT

The nondistillable residue from solvent refined coal, after extraction and distillation, is sprayed into a boiling pool of a non-solvent hydrocarbon liquid, whose boiling point is at least 50° F below the melting point of the residue. The solidified product may then be separated by mechanical means and further cooled by countercurrently contacting with a pre-cooled non-solvent hydrocarbon liquid which is employed to remove the sensible heat of the solvent refined coal liquid. The product is thus further cooled from the boiling liquid bath temperature. The resulting product is found to be hard, non-porous, non-tacky and resistant to disintegration and powder formation.

4 Claims, No Drawings

SOLIDIFYING SOLVENT REFINED COAL

This invention was made under contract with or supported by the Electric Power Research Institute.

BACKGROUND OF THE INVENTION

1. Field of the Invention

The current method of solidifying the residue after distillation of solvent refined coal is to spray the hot viscous liquid into a pool of water, which is maintained at a temperature below 212° F. The resulting solid product is found to have a number of undesirable properties. The product which results is highly porous and contains entrapped water at levels as high as from 10 to 30 weight percent. In addition, the porous product is very friable, so as to powder easily. Upon collection, storage, and transportation, fines are produced, which greatly interfere with the use of the product, as well as requiring protection for individuals from inhaling the fines.

Since the solidified residue is the major product, it is desirable to provide the residue in a form which can be readily used as a solid fuel. Therefore, it is necessary that means be provided for forming solid particles in a form which enhances their stability and integrity while still providing a product which burns easily and can be used as a fuel source.

2. Description of the Prior Arts

U.S. Pat. No. 3,748,254 discloses the conversion of solvent refined coal residues to a pelletized solid fuel. U.S. Pat. No. 3,317,289 discloses the manufacture of a smokeless fuel by extracting coal with a solvent, stripping the residue with a stripping agent and then briquetting the residue.

SUMMARY OF THE INVENTION

Useful non-friable substantially non-porous solid fuel particles are produced from volatile free solvent refined coal (SRC) by spraying the vacuum distillation residue at an elevated temperature under moderate pressure into a substantially immiscible liquid which has a boiling range such that it boils at least 50° F below the melting point of the SRC residue. The solidified particulate residue is separated from the liquid and may be further cooled by countercurrent contact with a pre-cooled immiscible liquid. The particles are then ready for use as a solid fuel.

DESCRIPTION OF THE SPECIFIC EMBODIMENTS

In accordance with the subject invention, a solvent refined coal product is obtained after removal of the volatiles which boil at or below a temperature at atmospheric pressure of about 800° F, more usually 650° F. The resulting hot residue, generally at a temperature above about 500° F is sprayed by means of a nozzle at moderate pressures into an immiscible liquid, whereby the residue solidifies to solid, non-permeable, sturdy particles. The immiscible liquid will boil at least in part at or below the solidification temperature of the SRC residue, which is generally in the range of about 300° to 375° F. The resulting particles, which can be of a variety of shapes depending upon the manner of spraying, may then be separated from the liquid and further cooled by contacting the particles with pre-cooled immiscible liquid. The particles are then ready for use as a fuel.

Solvent refined coal processes are well known in the art and need only be discussed generally here. A wide variety of coals may be processed, such coals being illustrated as lignite, bituminous coal and sub-bituminous coal. The feed coal, in a finally divided state and substantially free of water, is extracted with a suitable solvent in an extraction zone at an elevated temperature and pressure.

For the most part, the extractants are polycyclic aromatic hydrocarbons, which are maintained in the liquid state at the temperature and pressure of extraction. Particularly desirable solvents are aromatic solvents, which are partially hydrogenated, such as tetralin and dihydronaphthalene. The solvent employed is generally a mixture of hydrocarbons, although oxygenated aromatic compounds and other heterocyclic compounds may also be included.

The coal employed usually contains substantial quantities of ash. This ash is normally removed by a filtration along with unconverted coal after the extraction step and prior to the vacuum distillation step. The solvent refined coal product is essentially free of metal values. The final product of this invention is then composed substantially of combustibles and economies are achieved in that only materials having heating values are processed and transported.

The extraction may be carried out in a continuous, batch, staged or countercurrent process. The temperatures employed will normally be in the range of about 570° to 930° F. The pressures will normally be from about 1 to 6500 psig with a residence time of about 1 minute to 2 hours. The solvent to coal ratio may be varied widely, generally being in the range of 14:1. The process may be carried out non-catalytically or catalytically, with iron, cobalt and nickel being the usual catalysts. Generally, hydrogen will be employed, with up to 50 standard cubic feet of hydrogen per pound of coal being employed. Usually, at least about 75 weight percent of the coal is extracted, generally not more than about 95 weight percent of coal.

Initial separation of the liquid may be achieved mechanically by sedimentation, filtration, centrifugation or combination thereof, so that a substantially solids free fraction is obtained, with a residue having a high solids content. The volatiles may then be further removed by vacuum distillation, generally at pressures in the range of 0.05 to 0.5 atmospheres and at temperatures in the range of about 500° to 750° F, more usually about 525° to 610° F.

The resulting hot residue will generally be at a temperature at which the distillation is carried out or slightly below. Preferably, significant cooling is avoided, usually the temperature being maintained within at least about 120° F, more usually at least about 75° F of the temperature in the still which will be in the range of about 500° to 750° F.

The viscous liquid is then pressurized to a pressure from about 25 to 150 psig, more usually 35 to 75 psig and sprayed by means of a nozzle into an immiscible liquid. Depending upon the nature of the nozzle, the resulting particles can be formed in a wide variety of shapes and sizes. Also, by varing the pressure, the size and nature of the product can also be varied. The nozzle will generally be from about ¼ to 1 inch inner diameter.

For the most part, the immiscible liquid will be a hydrocarbon liquid which is highly paraffinic and/or naphthenic, preferably 50% or greater paraffinic. The liquids may be obtained as a product from the extraction of the coal, or as the distillate of the light liquid phase, followed by solvent extraction and/or hydrotreating. The ratio of liquid to SRC will generally be in the range of 0.1–0.3 parts by weight per part of liquid. This liquid will generally have a boiling range in the temperature range of 225° to 550° F, usually 250° to 450° F, with the mid-boiling point ($bp_{50}$) being in the range of 275° to 375° F. The API gravity will be in the range of 35 to 75, generally 50 to 60. The initial boiling temperature will generally be from about 0° to 50° F below the melting point of the SRC residue. The temperature of the bath will be maintained substantially constant by the refluxing of the liquid into which the residue is sprayed.

By controlling the rate of addition of the residue to the immiscible liquid, the volume of the immiscible liquid as compared to the amount of residue added, and the initial boiling point of the immiscible liquid, porosity can be minimized, so that the particles are capable of being handled and shipped without powdering.

The particles may then be collected by any convenient means such as filtration, sedimentation, centrifugation, or the like. The temperature of the particles will still be substantially over the ambient temperature and may be further cooled by treatment with an immiscible liquid which has been pre-cooled to below 140° F preferably below about 105° F, and more preferred is at about ambient temperature. The process can be carried out in a countercurrent manner, where the fluid flows by the particles. By appropriate choice of the hydrocarbon liquid, the heat of the particles can be absorbed as vaporization. By condensation of the vapor, the cool liquid is continuously returned to the contact zone.

The particles may then be transferred away from the cooling zone and freed of any residual hydrocarbon liquid by a gas stream or other means and are then ready for use as a fuel. The particles have good mechanical integrity, are relatively impermeable, and can be shipped and mechanically handled without powdering.

As illustrative of the subject invention, typically an SRC unit will process 10,000 tons per day of coal e.g. Illinois No. 6 coal, operating at a total pressure of 1700 psig, a hydrogen partial pressure at the reactor outlet of 1200 psig, a temperature of 845° F, a coal space velocity of 25 lbs. of coal/hr/ft$^3$ of reactor volume and a solvent to coal feed ratio of 2 parts of solvent to 1 part of coal, and about 40,000 SCF of hydrogen is circulated through the reactor per ton of coal feed.

After the slurry leaves the reactor, the gas and slurry phases are cooled, separated, and the slurry phase filtered to remove solids, e.g. ash and unconverted coal. The liquid is then distilled first at atmospheric pressure, then in vacuo to recover the solvent to slurry the feed coal. Fifty-five hundred tons per day of vacuum tower bottoms are the solvent refined coal product.

A centrifuge pump is used to remove the vacuum bottoms from the tower at 600° F. This pump develops a head of 50 psig and feeds the coal to a multiplicity of ¼ inch inner diameter nozzles submerged in a 55° API heavy naphtha pool in a large vessel operating at atmospheric pressure. The naptha is maintained at its initial boiling point of 275° F, and heat is recovered by condensing the naphtha vapors with cold water.

The average residence time of the SRC in the naphtha pool will vary from 5 to 60 minutes and the average concentration is about 0.15 parts of SRC per part by weight of naphtha. The residence time will vary with the size of the particle formed, with the size of the particle varying from about 0.25 to 1 inch and the length varying from 1 to 6 inches long.

Although the foregoing invention has been described in some detail by way of illustration and example for purposes of clarity of understanding, it will be obvious that certain changes and modifications may be practiced within the scope of the appended claims.

What is claimed is:
1. A method for solidifying the non-distillable residue from solvent refined coal, which comprises:
spraying said residue into an immiscible liquid selected from the group and oxygenated aromatic compounds and heterocyclic compounds hydrocarbon liquid boiling at a temperature not greater than the melting point of the solvent refined coal residue, wherein said residue is at a temperature of at least 500° F and the particles from the spray rapidly solidify to non-tacky non-porous particles.
2. A method according to claim 1, wherein said immiscible liquid is a primarily paraffinic hydrocarbon liquid.
3. A method according to claim 1, including the steps of separating said particles from said liquid; and
contacting the separated particles with a pre-cooled hydrocarbon liquid to reduce the temperature of said particles.
4. A method according to claim 1, wherein said solvent refined coal residue is at a temperature in the range of 500° to 750° F, the weight ratio of residue to liquid is in the range of about 0.1–0.3:1 and the residence time is in the range of about 5 to 60 minutes.

* * * * *